United States Patent
Tagare et al.

(10) Patent No.: US 12,127,295 B2
(45) Date of Patent: Oct. 22, 2024

(54) METHOD TO REDUCE EMERGENCY CALL SET-UP

(71) Applicant: QUALCOMM Incorporated, San Diego, CA (US)

(72) Inventors: Arun Ashok Tagare, Hyderabad (IN); Mudit Singh, Hyderabad (IN); Abhishek Shukla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/652,215

(22) Filed: Feb. 23, 2022

(65) Prior Publication Data
US 2023/0269830 A1  Aug. 24, 2023

(51) Int. Cl.
*H04W 76/50* (2018.01)
*H04W 36/12* (2009.01)
*H04W 76/10* (2018.01)

(52) U.S. Cl.
CPC ......... *H04W 76/50* (2018.02); *H04W 36/125* (2018.08); *H04W 76/10* (2018.02)

(58) Field of Classification Search
CPC . H04L 65/1069; H04L 65/1104; H04L 69/28; H04L 65/1016; H04L 65/80; H04L 67/14; H04L 67/141; H04L 41/0806; H04L 41/0895; H04L 63/0815; H04L 63/083; H04L 63/0884; H04L 65/1033; H04L 65/1073; H04L 65/1096; H04L 67/02; H04L 67/34; H04W 4/90; H04W 80/10; H04W 36/0022; H04W 60/005; H04W 60/04; H04W 76/10; H04W 76/18;
(Continued)

(56) References Cited

U.S. PATENT DOCUMENTS 10,244,574 B2 * 3/2019 Chiang ............ H04W 36/0022
10,462,643 B1 * 10/2019 Chiang ................. H04L 69/28
(Continued)

FOREIGN PATENT DOCUMENTS

CN     105071897 B  *  5/2018  ............... H04L 1/22
EP       3249875 A1     11/2017
(Continued)

OTHER PUBLICATIONS

International Search Report and Written Opinion—PCT/US2023/011076—ISA/EPO—May 4, 2023.

*Primary Examiner* — Matthew C Sams
(74) *Attorney, Agent, or Firm* — Procopio, Cory, Hargreaves & Savitch LLP

(57) ABSTRACT

Aspects presented herein may improve an emergency call establishment procedure by enabling a UE to transmit emergency register messages more efficiently. In one aspect, a UE transmits, to a network entity, a request to set up an ePDN. The UE receives, from the network entity, a response to the request comprising a set of multiple P-CSCF addresses. The UE transmits, to the network entity, a registering message to each of the multiple P-CSCF addresses simultaneously. The UE receives, from the network entity, at least one acceptance message from at least one of the set of multiple P-CSCF addresses in response to the registering message. The UE transmits, to the network entity, an invitation message to a P-CSCF address from which an acceptance message is received to establish an emergency call connection.

24 Claims, 10 Drawing Sheets

(58) Field of Classification Search
CPC ... H04W 76/19; H04W 84/042; H04W 60/00; H04W 8/00; H04W 84/00; H04W 76/50; H04W 36/125
See application file for complete search history.

(56) References Cited

U.S. PATENT DOCUMENTS

| | | | |
|---|---|---|---|
| 11,641,381 B2* | 5/2023 | Chiang | H04W 76/10 709/228 |
| 2005/0009520 A1* | 1/2005 | Herrero | H04L 61/4588 455/433 |
| 2009/0055899 A1* | 2/2009 | Deshpande | H04L 65/80 370/352 |
| 2009/0191841 A1* | 7/2009 | Edge | H04M 7/127 455/404.1 |
| 2012/0166652 A1* | 6/2012 | Bouthemy | H04L 65/4053 709/227 |
| 2018/0263066 A1* | 9/2018 | Chiang | H04W 4/90 |
| 2019/0253862 A1 | 8/2019 | Park et al. | |
| 2019/0313229 A1* | 10/2019 | Chiang | H04W 4/90 |
| 2021/0036919 A1* | 2/2021 | Foti | H04L 65/1016 |
| 2021/0051141 A1* | 2/2021 | Duriseati | H04L 63/0884 |

FOREIGN PATENT DOCUMENTS

| | | | | |
|---|---|---|---|---|
| EP | 3697062 A1 | 8/2020 | | |
| JP | 2020036188 A | 3/2020 | | |
| WO | WO-2010083715 A1 * | 7/2010 | | H04L 65/1016 |

* cited by examiner

METHOD TO REDUCE EMERGENCY CALL SET-UP

TECHNICAL FIELD

The present disclosure relates generally to communication systems, and more particularly, to wireless communication involving emergency call.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits, to a network entity, a request to set up an emergency packet data network (ePDN). The apparatus receives, from the network entity, a response to the request comprising a set of multiple proxy-call session control function (P-CSCF) addresses. The apparatus transmits, to the network entity, a registering message to each of the multiple P-CSCF addresses simultaneously.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
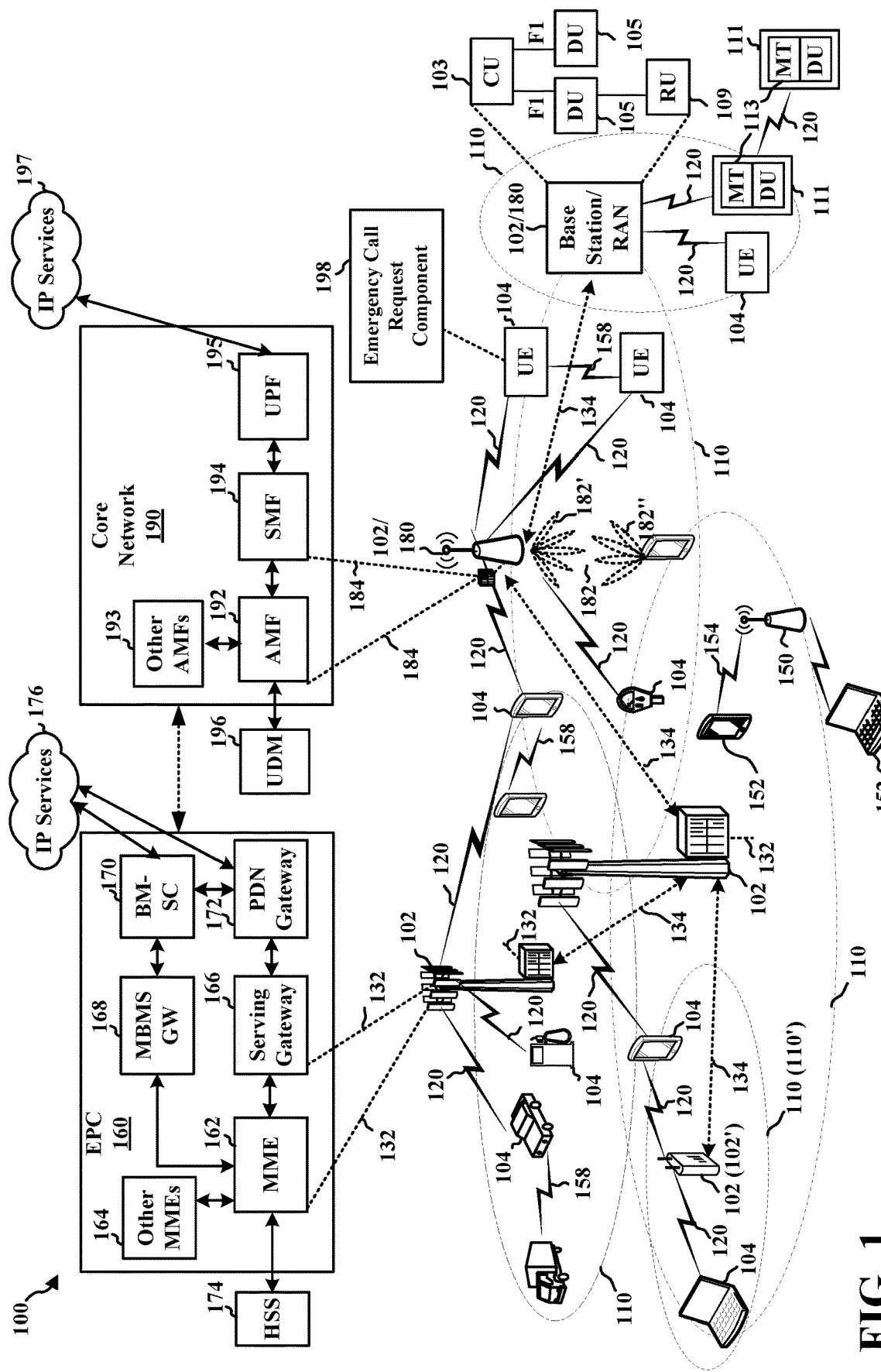
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve an emergency call establishment procedure by enabling a UE to transmit emergency register messages more efficiently. In one aspect of the present disclosure, a UE may be configured to transmit an emergency register message to multiple P-CSCF addresses (received in an emergency PDN response message) simultaneously, such that the UE may try to connect with multiple P-CSCF addresses at the same time to increase the likelihood of receiving a response from at least one of the multiple P-CSCF addresses, thereby improving the efficiency of the emergency call establishment. In other words, aspects presented herein may enable a UE to send an emergency register message (which may also be referred to as "emergency register request") to all the received P-CSCF addresses in an emergency PDN response at the same time. Once the UE receives the response for the emergency register message on any of the P-CSCF addresses, the UE may send an emergency invite message to the corresponding P-CSCF addresses to complete setting up the emergency call. As such, aspects presented herein may minimize the time it takes for a UE to set up the emergency call.

In certain aspects, the UE 104 (e.g., a vehicle UE) may include an emergency call request component 198 configured to transmit an emergency register message to multiple P-CSCF addresses simultaneously to improve the efficiency and latency of an emergency call set up. In one configuration, the emergency call request component 198 may transmit, to a network entity, a request to set up an emergency packet data network. In such configuration, the emergency call request component 198 may receive, from the network entity, a response to the request comprising a set of multiple P-CSCF addresses. In such configuration, the emergency call request component 198 may transmit, to the network entity, a registering message to each of the multiple P-CSCF addresses simultaneously.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central/centralized unit (CU) 103, one or more distributed units (DU) 105, and/or one or more radio units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
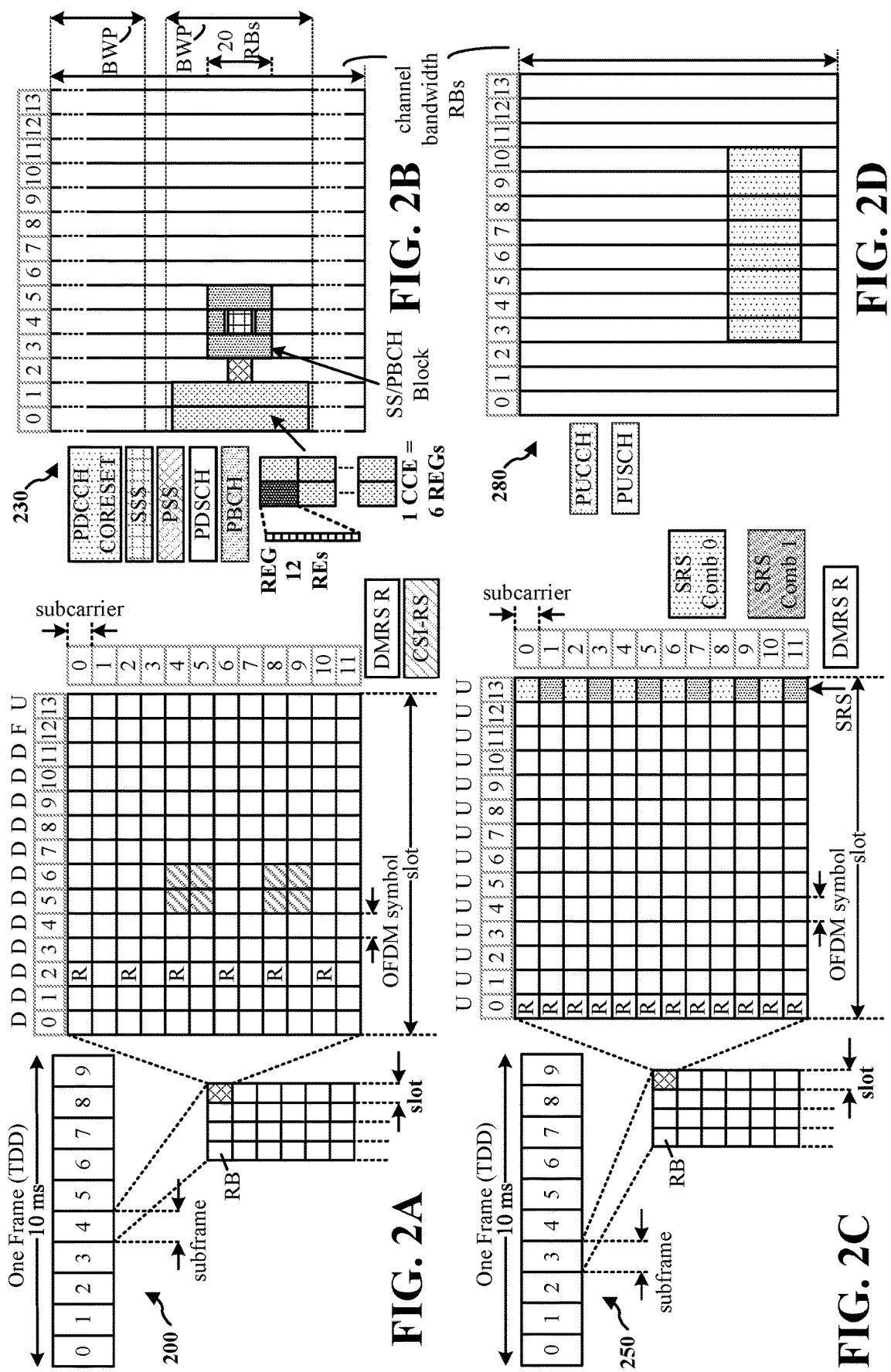
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
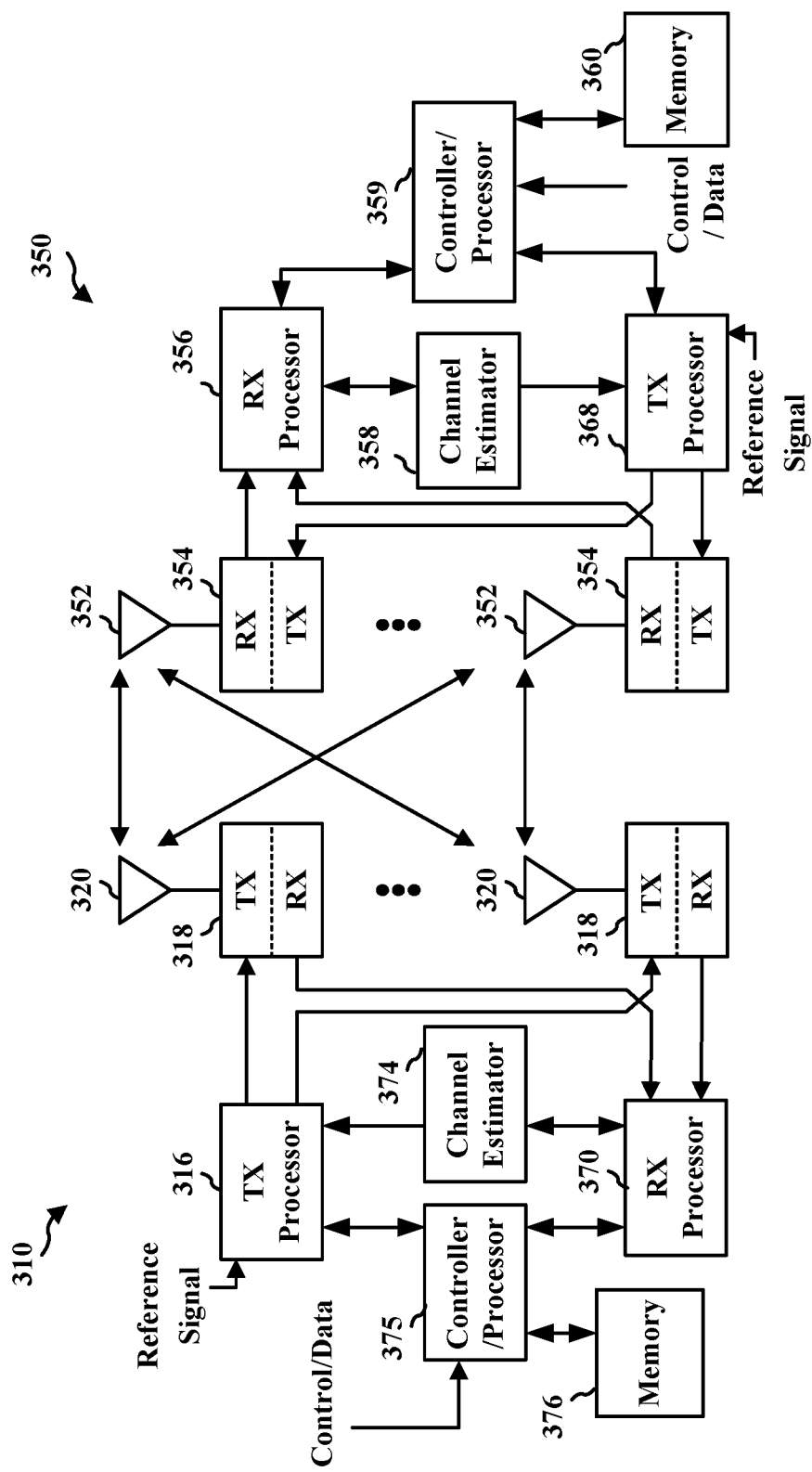
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the emergency call request component 198 of FIG. 1.

In some scenarios, a user equipment (UE) (e.g., a mobile phone, a wearable device, etc.) may be used by an end user for making an emergency call, such as when there is a fire or a crime, or when someone is injured. When a UE makes an emergency call via a network, the network may assign a higher priority to the emergency call over non-emergency calls. In addition, different networks may provide different emergency service architectures and follow different emergency call establishment procedures or protocols.

Figure 4:
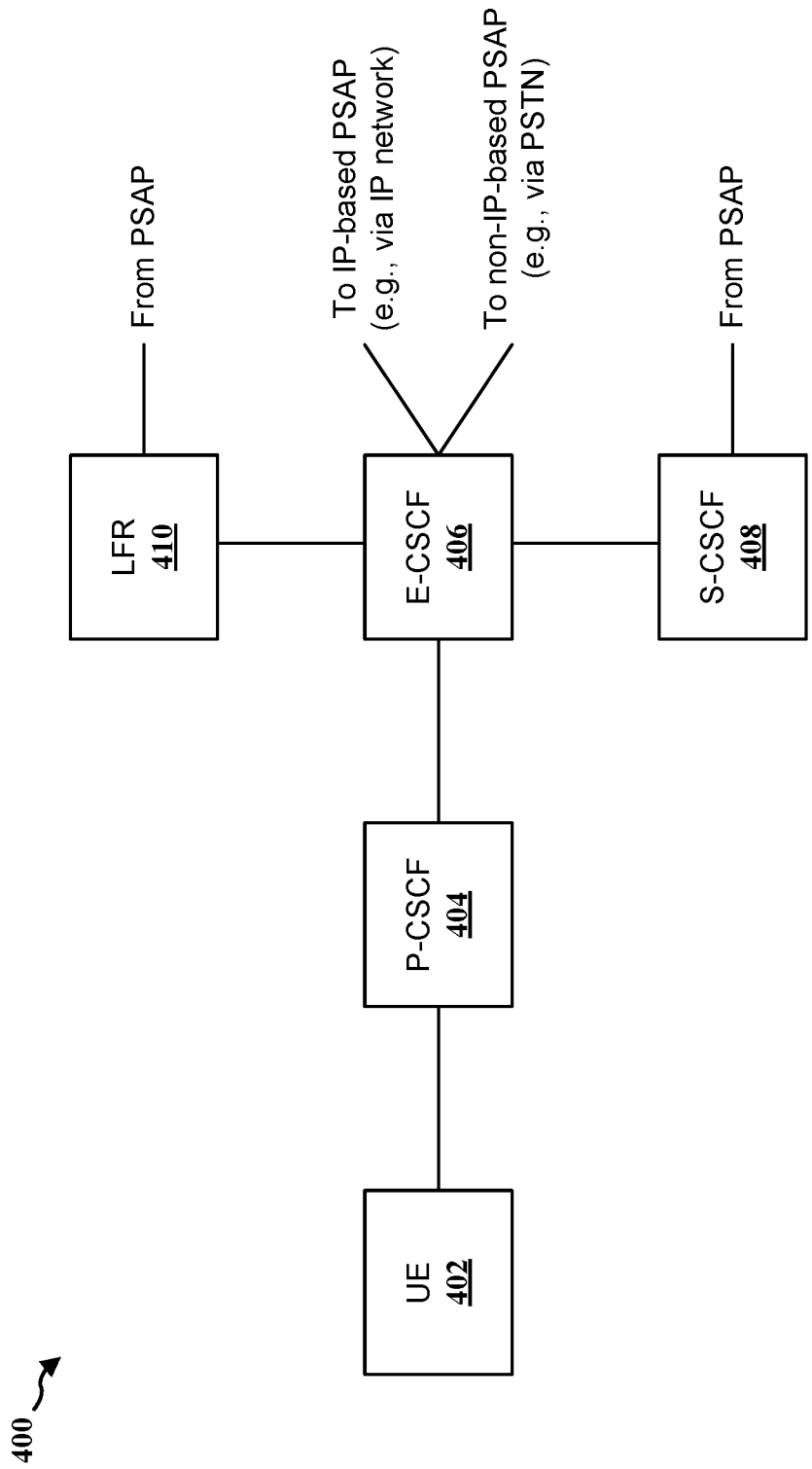
FIG. 4 is a diagram illustrating an example emergency service architecture that is based on an internet protocol (IP) multimedia subsystem (IMS) in accordance with various aspects of the present disclosure.

FIG. 4 is a diagram 400 illustrating an example emergency service architecture that is based on an Internet Protocol (IP) multimedia subsystem (IMS) in accordance with various aspects of the present disclosure. An emergency service architecture may include multiple functional entities. For example, an emergency service architecture may include a UE 402, a proxy-call session control function (P-CSCF) 404, an emergency-call session control function (E-CSCF) 406, a serving-call session control function (S-CSCF) 408, and/or a location retrieval function (LRF) 410, etc. The P-CSCF 404 and the E-CSCF 406 may be associated with session initiation protocol (SIP) servers, e.g., a voice over internet protocol (VoIP) communication service that includes feature(s) and call processing function(s) of a public switched telephone network (PSTN). As such, the SIP servers may be configured to handle different parts of an emergency session's establishment and/or termination.

The P-CSCF 404 may be the first point of contact between the UE 402 and the network. The P-CSCF 404 may function as an inbound/outbound proxy, and may performs authentication/authorization, emergency session prioritization, and/or application level routing to an appropriate E-CSCF (e.g., the E-CSCF 406).

The E-CSCF 406 may be responsible for acquiring/validating the location of the UE 402 (e.g., by interacting with the LRF 410) and routing an emergency call from the UE 402 to an appropriate (IP-enabled or non-IP-enabled) public safety answering point (PSAP). The LRF 410 may interact with one or more location severs and/or the access network to obtain information related to the location of the UE that initiates the emergency call session (e.g., the UE 402). In some examples, the LRF 410 may also provide PSAP route determination services.

The S-CSCF 408 may be responsible for session control. For example, subscribers (e.g., the UE 402) may be allocated with a S-CSCF for the duration of their IMS registration in order to facilitate routing of SIP messages as part of service establishment procedures. Consequently, the S-CSCF 408 may download a subscriber profile from a home subscriber server (HSS) at the time of registration, which allows the S-CSCF 408 to ascertain which application server any service requests to be sent to. In some examples, the S-CSCF 408 may also be associated with breakout to the PSTN if this is supported.

The UE 402 may be responsible for detecting that an emergency session is being established (e.g., based on the number dialed by an end user), registering with an IMS using a specified emergency public user ID, determining its location if possible (e.g., using an internal location measurement mechanism or by interacting with an access network), and/or send an emergency session establishment request to the P-CSCF 404 with specified information (e.g. the emergency public user ID and/or the location information). Then, the P-CSCF 404 may perform authorization/authentication of the emergency session and the user, prioritize the emergency session, and forward the emergency session establishment request to an E-CSCF (e.g., the E-CSCF 406) in the same network. In some scenarios, if the location information provided by the UE 402 is insufficient (e.g., missing or inaccurate), the E-CSCF 406 may interact with the LRF 410 to acquire/validate the information. After that, the E-CSCF 406 may determine the address of an appropriate PSAP (e.g., based on the information), and the E-CSCF 406 may route the emergency call to this PSAP to complete the call establishment.

Figure 5:
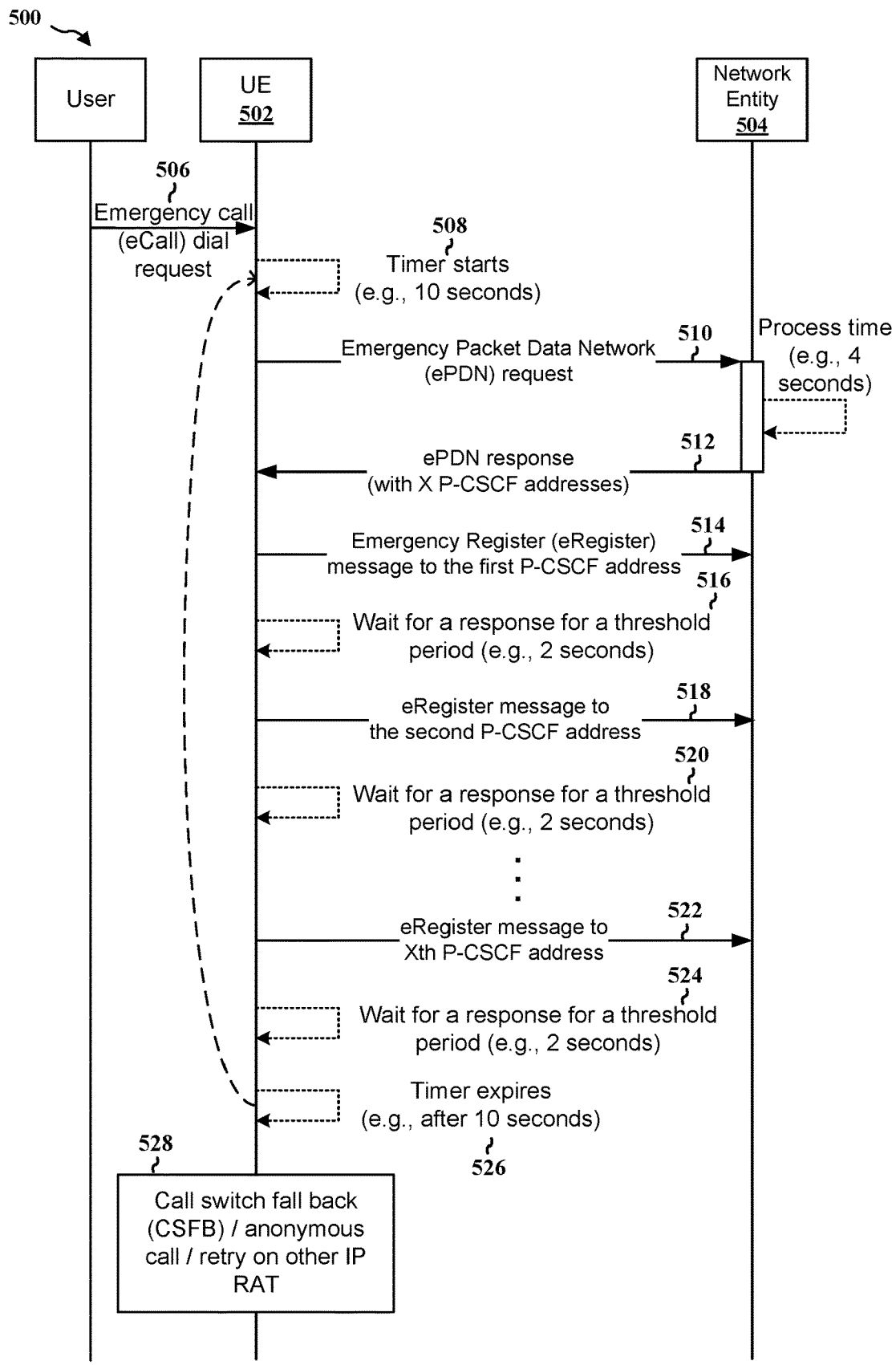
FIG. 5 is a communication flow illustrating an example procedure of setting up an emergency call between a UE and a network in accordance with various aspects of the present disclosure.

FIG. 5 is a communication flow 500 illustrating an example procedure of setting up an emergency call between a UE and a network (or a network entity) in accordance with various aspects of the present disclosure. The numberings associated with the communication flow 500 do not specify a particular temporal order and are merely used as references for the communication flow 500.

At 506, a user may make an emergency call via a UE 502. The UE 502 may be a mobile phone, a wearable device, or any device with a communication function, etc.

At 508, after the UE 502 detects that an emergency call is made by the user, such as based on the number dialed by the user or an emergency function triggered by the user, the UE 502 may initiate an emergency call set up timer. The emergency call set up timer may define a duration in which the UE 502 may try to establish a connection with a network entity (e.g., a base station, a network server associated with emergency services, etc.). If the UE 502 is unable to establish a connection with a network entity before the emergency call set up timer expires (which may also be referred to as the emergency call set up timer fires), the UE 502 may take an additional action, such as performing a call switch fallback (CSFB) procedure, establish the emergency call anonymously, and/or retry the emergency call on other IP radio access technology (RAT). For example, if the emergency call set up timer is configured to be ten (10) seconds and the UE 502 is unable to establish a connection with a network entity within the ten seconds, the UE 502 may initiate a CSFB procedure, establish the emergency call anonymously, or retry the emergency call on another IP RAT (e.g., 5G NR, 4G LTE, Wi-Fi, etc.).

At 510, the UE 502 may transmit an emergency packet data network (ePDN) request to a network entity 504 to initiate an emergency call establishment with the network entity 504. For purposes of the present disclosure, the term "packet data network" or "PDN" may be a generic description for a network that provides data services. Packet switching may refer a mode of data transmission in which a message is broken into a number of parts that are sent independently, over whatever route is optimum for each packet, and reassembled at the destination. For example, the Internet may be a PDN.

At 512, in response to the ePDN request, the network entity 504 may transmit an ePDN response that includes one or more P-CSCF addresses (e.g., up to X P-CSCF addresses), where the one or more P-CSCF addresses may be associated with where the network entity 504 is going to receive an emergency invite (eINVITE) message from the UE 502 to complete establishing the emergency call.

After the UE 502 receives the ePDN response with one or more P-CSCF addresses, the UE 502 may be configured to transmit an emergency register (eREGISTER) message to one P-CSCF address at a time. If the P-CSCF address responds to the UE 502's eREGISTER message, then the UE 502 may establish an emergency call with the network entity 504 based on that P-CSCF address, such as by sending an eINVITE message to that P-CSCF address. However, if the P-CSCF address does not respond to the UE 502's eREGISTER message within a threshold period, the UE 502 may transmit the eREGISTER message to another P-CSCF address (e.g., if multiple P-CSCF addresses are included in the ePDN response).

For example, if the ePDN response includes X P-CSCF addresses, at 514, the UE 502 may transmit an eREGISTER message to the network entity 504 via a first P-CSCF address in the X P-CSCF addresses. Then, at 516, the UE 502 may wait for a response from the first P-CSCF address for a threshold period (e.g., 2 seconds). If the UE 502 receives a response from the first P-CSCF address within the threshold period, the UE 502 may establish an emergency call session with the network entity 504 based on the first P-CSCF address, such as by transmitting an eINVITE message to the first P-CSCF address. On the other hand, if the UE 502 does not receive a response from the first P-CSCF address within the threshold period, at 518, the UE 502 may transmit the eREGISTER message to a second P-CSCF address in the X P-CSCF addresses. Similarly, at 520, the UE 502 may wait for a response from the second P-CSCF address for a threshold period. If the UE 502 does not receive a response from the second P-CSCF address within the threshold period, the UE 502 may continue to transmit the eREGISTER message to a next P-CSCF address in the X P-CSCF addresses (e.g., to a third P-CSCF address, a fourth P-CSCF address, and up to $X^{th}$ P-CSCF address, etc.) if the UE 502 does not receive a response to the corresponding eREGISTER message the UE 502 transmits, such as shown at 522 and 524. The UE 502 may continue this process until a response is received from a corresponding P-CSCF address or until the emergency call set up timer initiated at 508 expires. In some scenarios, the UE 502 may not be able to transmit the eREGISTER message to each of the X P-CSCF addresses (i.e., to all P-CSCF addresses in the ePDN response) before the emergency call set up timer expires. For example, if the emergency call set up timer is configured to be ten (10) seconds and it takes four seconds for the network entity 504 to process the UE 502's ePDN request, it may leave the UE 502 with six (6) seconds to transmit the eREGISTER message. If the threshold period for waiting for a response from a corresponding P-CSCF address is two (2) seconds, then the UE 502 may be able to transmit the eREGISTER message to at most three (3) P-CSCF addresses (if none of the P-CSCF addresses responds to the eREGISTER message)

At 526, if the emergency call set up timer expires and the UE 502 does not receive a response from any of the P-CSCF addresses, the UE 502 may be configured to take an additional action. For example, as shown at 528, the UE 502 may initiate an CSFB procedure, establish the emergency call anonymously by transmitting an anonymous eINVITE message to one of the P-CSCF addresses, and/or retry the emergency call on other IP RAT (e.g., 5G NR, 4G LTE, Wi-Fi, etc.). The CSFB procedure may refer to a procedure where voice and short message service (SMS) services are delivered to UEs through the use of global system for mobiles (GSM) or another circuit-switched network. For example, when an LTE network is not available for a UE to make or receive either a call or an SMS message, the UE may be configured to falls back to a more accessible 3G or 2G network to finish the call or to send the SMS message.

In some scenarios, as shown by the communication flow 500, if a UE makes an emergency call and received multiple PCSCF addresses during the ePDN connection (e.g., from the ePDN response as shown at 512), it may take the UE more time to set up the emergency call if the connection with each P-CSCF address is not successful. For example, when a user dials an emergency call via a UE, the UE may set up an ePDN (e.g., by transmitting an ePDN request) with a network, and the network may assign one or more PCSCF addresses to the UE (e.g., via an ePDN response) where the network wants to receive eINVITE messages. If the UE transmits an eREGISTER message to the network and the network rejects it, then the UE may transmit an anonymous eINVITE message to the same P-CSCF address. If the eINVITE message is rejected with an error, then the CSFB procedure may end. On the other hand, if no response is received for the eREGISTER message, then the UE may be configured to wait until the emergency call set up timer expires. For example, if the emergency call set up timer is ten (10) seconds, then the UE may be specified to wait for ten seconds if no response is received for the eREGISTER messages the UE transmits. This may result in a longer time to set up an emergency call. In addition, if a call switch (CS) sunset happens, the UE may be specified to move to other IP RATs and restart the emergency call establishment procedure described in connection with FIG. 5, where again the UE may receive multiple P-CSCF addresses (e.g., 3 to 5) for the emergency call (from the new IP RAT). This may take another ten seconds if no response is received for the eREGISTER messages the UE transmits (e.g., a total of twenty (20) seconds up to this point). In some examples, if multiple IP RATs are available, the set up time may be longer. For example, the set up time make take approximately thirty (30) seconds if 5G NR, LTE, and/or Wi-Fi RAT are available, which may delay the time for the UE to send an eINVITE message to the network to complete the emergency call setup.

Aspects presented herein may improve an emergency call establishment procedure by enabling a UE to transmit emergency register messages more efficiently. In one aspect of the present disclosure, a UE may be configured to transmit an emergency register message to multiple P-CSCF addresses (received in an emergency PDN response message) simultaneously, such that the UE may try to connect with multiple P-CSCF addresses at the same time to increase the likelihood of receiving a response from at least one of the multiple P-CSCF addresses, thereby improving the efficiency of the emergency call establishment. In other words, aspects presented herein may enable a UE to send an eREGISTER message (which may also be referred to as "eREGISTER request") to all the received P-CSCF addresses in an ePDN response at the same time. Once the UE receives the response for the eREGISTER message on any of the P-CSCF addresses, the UE may send the eINVITE message to the corresponding P-CSCF addresses to complete setting up the emergency call. As such, aspects presented herein may minimize the time it takes for a UE to set up the emergency call.

Figure 6:
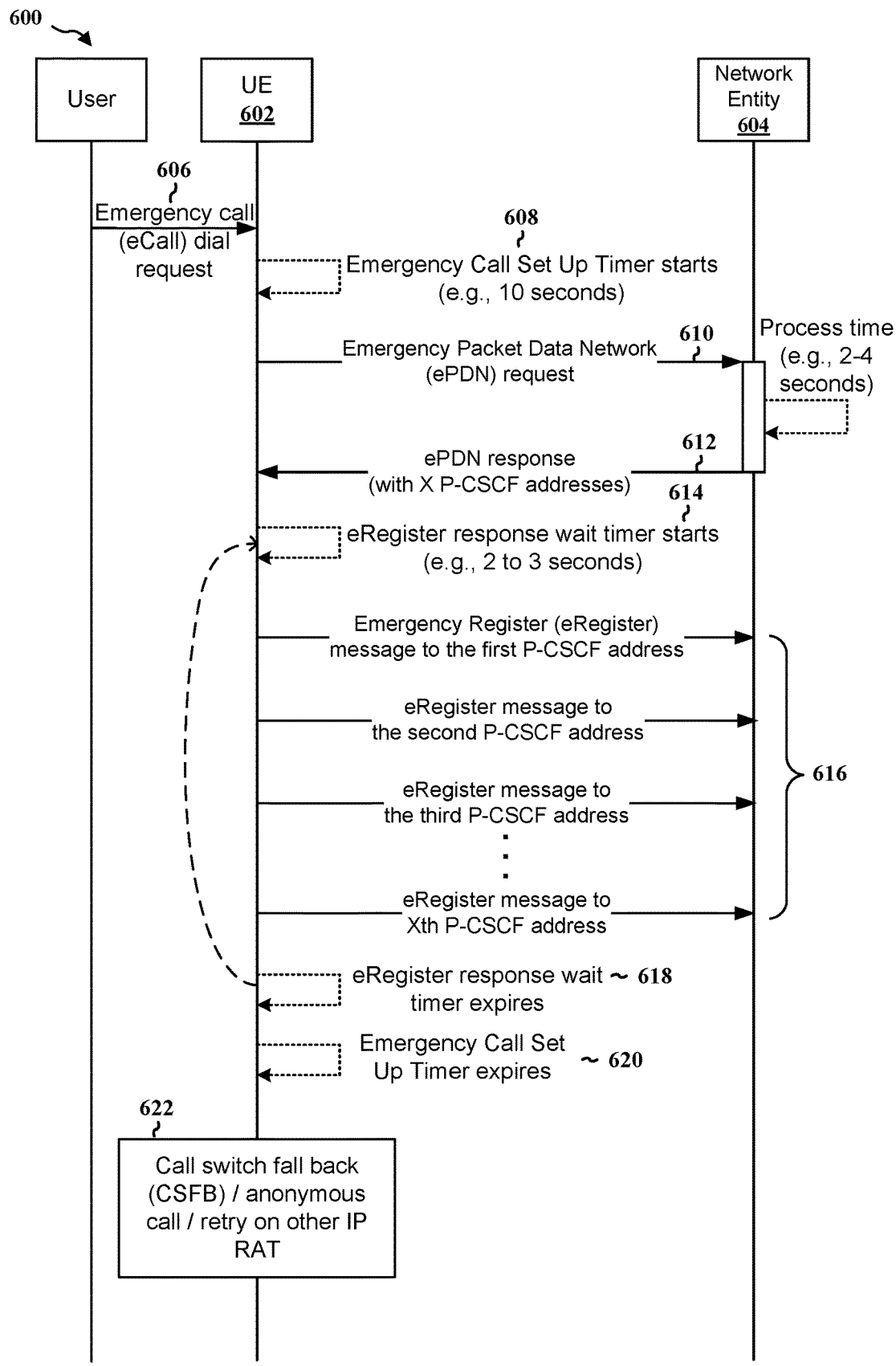
FIG. 6 is a communication flow illustrating an example procedure of setting up an emergency call between a UE and a network in accordance with various aspects of the present disclosure.

FIG. 6 is a communication flow 600 illustrating an example procedure of setting up an emergency call between a UE and a network in accordance with various aspects of the present disclosure. The numberings associated with the communication flow 600 do not specify a particular temporal order and are merely used as references for the communication flow 600.

At 606, a user may make an emergency call via a UE 602. The UE 602 may be a mobile phone, a wearable device, or any device with a communication function, etc.

At 608, after the UE 602 detects that an emergency call is made by the user, such as based on the number dialed by the user or an emergency function triggered by the user, the UE 602 may initiate an emergency call set up timer. The emergency call set up timer may define a duration in which the UE 602 may try to establish a connection with a network entity (e.g., a base station, a network server associated with emergency services, etc.). If the UE 602 is unable to establish a connection with a network entity before the emergency call set up timer expires (which may also be referred to as the emergency call set up timer fires), the UE 602 may take an additional action, such as performing an CSFB procedure, establish the emergency call anonymously, and/or retry the emergency call on other IP RAT(s). For example, if the emergency call set up timer is configured to be ten (10) seconds and the UE 602 is unable to establish a connection with a network entity within the ten seconds, the UE 602 may initiate a CSFB procedure, establish the emergency call anonymously, or retry the emergency call on another IP RAT (e.g., 6G NR, 4G LTE, Wi-Fi, etc.).

At 610, the UE 602 may transmit an ePDN request to a network entity 604 to initiate an emergency call establishment with the network entity 604. For purposes of the present disclosure, the term "packet data network" or "PDN" may be a generic description for a network that provides data services. Packet switching may refer a mode of data transmission in which a message is broken into a number of parts that are sent independently, over whatever route is optimum for each packet, and reassembled at the destination. For example, the Internet may be a PDN. The network entity 604 may be a base station or one or more components of the base station. For example, as described in connection with FIG. 1, in some aspects, a base station may include disaggregated components, such as a CU, one or more DUs, one or more RUs, one or more TRPs, one or more relays, one or more intelligent reflective surfaces, and/or a combination thereof.

As such, for purposes of the present disclosure, the term "network entity" or the term "base station" may include component(s) of a base station. In some examples, the term "base station" may be used interchangeably with the term "network entity" or "network node," which may refer to one or more disaggregated components of a base station.

At 612, in response to the ePDN request, the network entity 604 may transmit an ePDN response that includes one or more P-CSCF addresses (e.g., up to X P-CSCF addresses), where the one or more P-CSCF addresses may be associated with where the network entity 604 is going to receive an eINVITE message from the UE 602 to complete establishing the emergency call.

After the UE 602 receives the ePDN response with one or more P-CSCF addresses, the UE 602 may be configured to transmit an eREGISTER message (which may also be referred to as an eREGISTER request) to multiple P-CSCF addresses (e.g., a subset of the one or more P-CSCF addresses) or all of the one or more P-CSCF addresses at the same time. If any of the one or more P-CSCF addresses responds to the UE 602's eREGISTER message, then the UE 602 may establish an emergency call with the network entity 604 based on that P-CSCF address, such as by sending an eINVITE message to that P-CSCF address. In some examples, if the UE 602 receives multiple responses from multiple P-CSCF addresses, the UE 602 may transmit the eINVITE message to the first P-CSCF address in which the response to the eREGISTER message is first received. For example, if the UE 602 transmits the eREGISTER message to five P-CSCF addresses and receives a response to the eREGISTER message from the third P-CSCF address first, then from the fifth P-CSCF address, and then from the first P-CSCF address, the UE 602 may transmit the eINVITE message to the third P-CSCF address. However, if none of the one or more P-CSCF addresses responds to the UE 602's emergency register message within a threshold period, the UE 602 may take an additional action.

For example, if the ePDN response includes X P-CSCF addresses, at 614, the UE 602 may initiate an eREGISTER response wait timer (e.g., 2 to 4 seconds). The eREGISTER response wait timer may define a time duration in which the UE 602 may wait for receiving a response from the one or more P-CSCF addresses. Then, at 616, the UE 602 may simultaneously transmit an eREGISTER message to the network entity 604 via multiple P-CSCF addresses (e.g., a subset of the one or more P-CSCF addresses) or all of the one or more P-CSCF addresses.

At 618, the UE 602 may wait/monitor for a response from any of the one or more P-CSCF addresses until the eREGISTER response wait timer expires. If the UE 602 receives a response from any of the one or more P-CSCF addresses before the eREGISTER response wait timer expires, the UE 602 may establish an emergency call session with the network entity 604 based on at last one of the one or more P-CSCF addresses, such as by transmitting an eINVITE message to a P-CSCF address in which the response is first received. On the other hand, if the UE 602 does not receive a response from any of the one or more P-CSCF addresses before the eREGISTER response wait timer expires, the UE 602 may be configured to take an additional action. For example, as shown at 622, the UE 602 may initiate an CSFB procedure, establish the emergency call anonymously by transmitting an anonymous eINVITE message to one of the P-CSCF addresses, and/or retry the emergency call on other IP RAT (e.g., 5G NR, 4G LTE, Wi-Fi, etc.). The CSFB procedure may refer to a procedure where voice and SMS services are delivered to UEs through the use of GSM or another circuit-switched network. For example, when an LTE network is not available for a UE to make or receive either a call or an SMS message, the UE may be configured to falls back to a more accessible 3G or 2G network to finish the call or to send the SMS message.

At 620, if the emergency call set up timer expires and the UE 602 does not receive a response for its ePDN request (e.g., at 612), the UE 602 may be configured to take an additional action, such as initiating an CSFB procedure, establishing the emergency call anonymously, and/or retry the emergency call on other IP RAT as described at 722. In another example, if the UE 602 receives the ePDN response at 612 that includes multiple P-CSCF addresses but the UE 602 does not have sufficient time to transmit an eREGISTER message to the multiple P-CSCF addresses or to wait for a response from at least one of the multiple P-CSCF addresses before the emergency call set up timer expires, the UE 602 may be also configured to take the additional action described at 722. For example, if the emergency call set up timer is configured to be 10 seconds and the UE 602 receives an ePDN response after 9 seconds, even if the UE 602 is able to send an eREGISTER message to all P-CSCF addresses within 1 second, the UE 602 may not be able to receive a response from any of the P-CSCF addresses before the emergency call set up timer expires. As such, the UE 602 may take the additional action described at 622. In other words, the UE 602 may be configured to take the additional action at 622 if one of the timers (i.e., the emergency call set up timer initiated at 608 and the eREGISTER response wait timer initiated at 614) expires.

As such, aspects described in connection with FIG. 6 may enable a UE to establish an emergency call via multiple P-CSCF addresses at the same time to reduce the set up time for the emergency call and to maximize the success rate of receiving a response from at least one of the multiple P-CSCF addresses.

Figure 7:
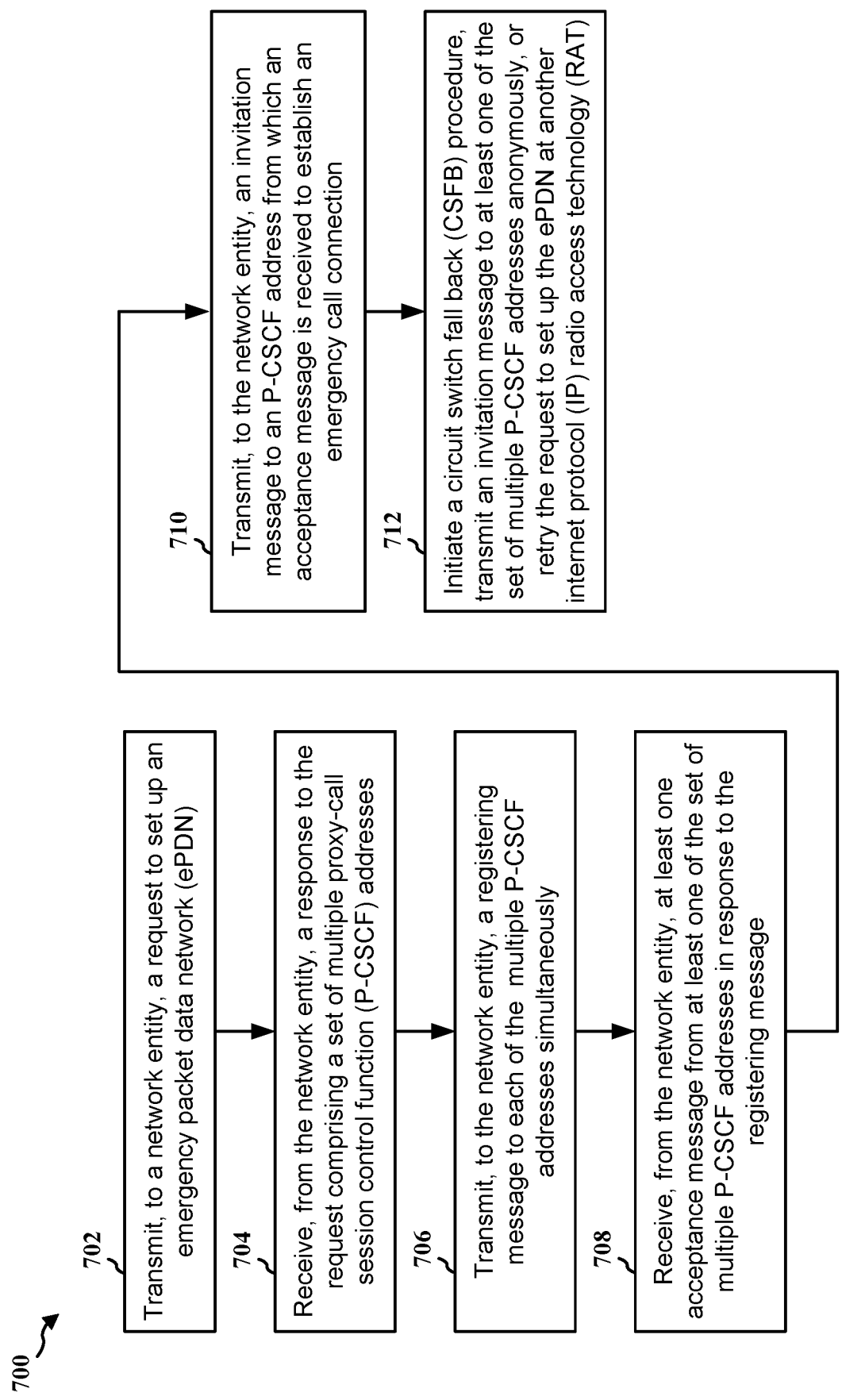
FIG. 7 is a flowchart of a method of wireless communication in accordance with various aspects of the present disclosure.

FIG. 7 is a flowchart 700 of a method of wireless communication. The method may be performed by a UE or a component of a UE (e.g., the UE 104, 350, 402, 602; the apparatus 902; a processing system, which may include the memory 360 and which may be the entire UE 350 or a component of the UE 350, such as the TX processor 368, the RX processor 356, and/or the controller/processor 359). The method may improve an emergency call establishment procedure by enabling the UE to transmit emergency register messages more efficiently.

At 702, the UE may transmit, to a network entity, a request to set up an ePDN, such as described in connection with FIG. 6. For example, at 610, the UE 602 may transmit, to the network entity 604, a request to set up an ePDN. The transmission of the request to set up an ePDN may be performed by, e.g., the ePDN request component 940 and/or the transmission component 934 of the apparatus 902 in FIG. 9.

In one example, the network entity may include a base station or one or more components of the base station.

At 704, the UE may receive, from the network entity, a response to the request comprising a set of multiple P-CSCF addresses, such as described in connection with FIG. 6. For example, at 612, the UE 602 may receive, from the network entity 604, a response to the request including a set of multiple P-CSCF addresses. The reception of the response may be performed by, e.g., the ePDN response process component 942 and/or the reception component 930 of the apparatus 902 in FIG. 9.

At 706, the UE may transmit, to the network entity, a registering message to each of the multiple P-CSCF addresses simultaneously, such as described in connection with FIG. 6. For example, at 616, the UE 602 may transmit, to the network entity 604, a registering message to each of the multiple P-CSCF addresses simultaneously. The transmission of the registering message may be performed by, e.g., the eREGISTER message component 944 and/or the transmission component 934 of the apparatus 902 in FIG. 9.

At 708, the UE may receive, from the network entity, at least one acceptance message from at least one of the set of multiple P-CSCF addresses in response to the registering message, such as described in connection with FIG. 6. The reception of the at least one acceptance message may be performed by, e.g., the acceptance process component 946 and/or the reception component 930 of the apparatus 902 in FIG. 9.

In one example, the UE may receive, from the network entity, a plurality of acceptance messages from a subset of the set of multiple P-CSCF addresses based on the registering message. Then, the UE may transmit, to the network entity, an invitation message to one of the subset of the set of multiple P-CSCF addresses to establish an emergency call connection. In such an example, the invitation message may be transmitted to a P-CSCF address for which an acceptance message is first received.

At 710, the UE may transmit, to the network entity, an invitation message to a P-CSCF address from which an acceptance message is received to establish an emergency call connection, such as described in connection with FIG. 6. The transmission of the invitation message may be performed by, e.g., the invitation message component 948 and/or the transmission component 934 of the apparatus 902 in FIG. 9.

In one example, if no response is received from any of the set of multiple P-CSCF addresses within a threshold period, or if a rejection is received from one or more of the set of multiple P-CSCF addresses within a threshold period, at 712, the UE may initiate an CSFB procedure, transmit an invitation message to at least one of the set of multiple P-CSCF addresses anonymously, or retry the request to set up the ePDN at another IP RAT, such as described in connection with FIG. 6. For example, at 622, the UE 602 may transmit an invitation message to at least one of the set of multiple P-CSCF addresses anonymously, or retry the request to set up the ePDN at another IP RAT if the eREGISTER response wait timer or the emergency call set up timer expires. The initiation of the CSFB procedure, transmission of the invitation message anonymously, or retrying the request to set up the ePDN at another IP RAT may be performed by, e.g., the alternative procedure initiation component 950 of the apparatus 902 in FIG. 9.

In one example, the IP RAT may include 5G NR, 4G LTE, or Wi-Fi.

Figure 8:
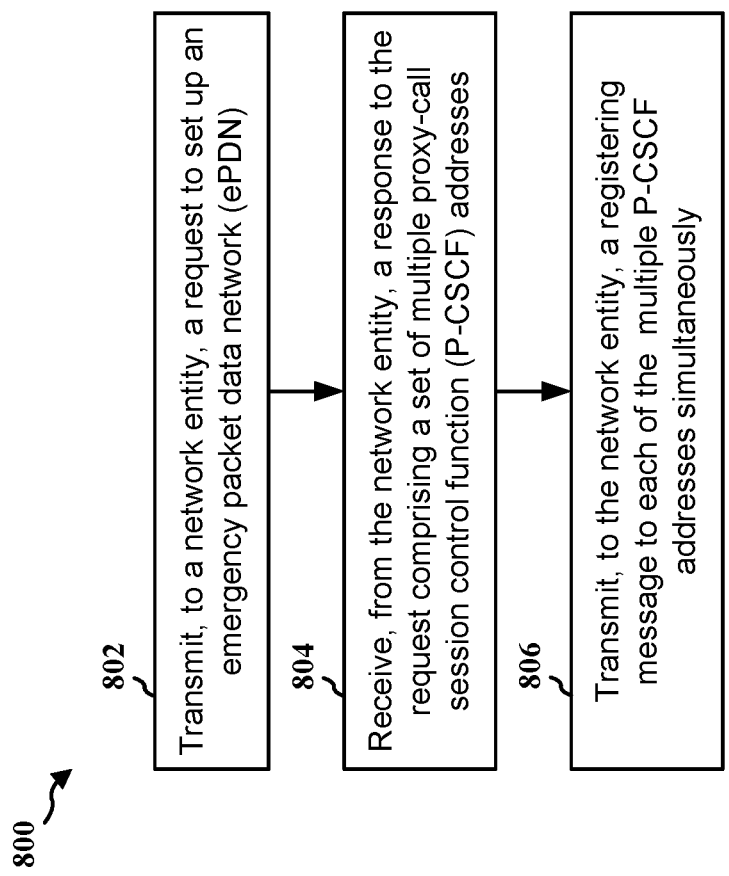
FIG. 8 is a flowchart of a method of wireless communication in accordance with various aspects of the present disclosure.

FIG. 8 is a flowchart 800 of a method of wireless communication. The method may be performed by a UE or a component of a UE (e.g., the UE 104, 350, 402, 602; the apparatus 902; a processing system, which may include the memory 360 and which may be the entire UE 350 or a component of the UE 350, such as the TX processor 368, the RX processor 356, and/or the controller/processor 359). The method may improve an emergency call establishment procedure by enabling the UE to transmit emergency register messages more efficiently.

At 802, the UE may transmit, to a network entity, a request to set up an ePDN, such as described in connection with FIG. 6. For example, at 610, the UE 602 may transmit, to the network entity 604, a request to set up an ePDN. The transmission of the request to set up an ePDN may be performed by, e.g., the ePDN request component 940 and/or the transmission component 934 of the apparatus 902 in FIG. 9.

In one example, the network entity may include a base station or one or more components of the base station.

At 804, the UE may receive, from the network entity, a response to the request comprising a set of multiple P-CSCF addresses, such as described in connection with FIG. 6. For example, at 612, the UE 602 may receive, from the network entity 604, a response to the request including a set of multiple P-CSCF addresses. The reception of the response may be performed by, e.g., the ePDN response process component 942 and/or the reception component 930 of the apparatus 902 in FIG. 9.

At 806, the UE may transmit, to the network entity, a registering message to each of the multiple P-CSCF addresses simultaneously, such as described in connection with FIG. 6. For example, at 616, the UE 602 may transmit, to the network entity 604, a registering message to each of the multiple P-CSCF addresses simultaneously. The transmission of the registering message may be performed by, e.g., the eREGISTER message component 944 and/or the transmission component 934 of the apparatus 902 in FIG. 9.

In one example, the UE may receive, from the network entity, at least one acceptance message from at least one of the set of multiple P-CSCF addresses in response to the registering message, such as described in connection with FIG. 6. The reception of the at least one acceptance message may be performed by, e.g., the acceptance process component 946 and/or the reception component 930 of the apparatus 902 in FIG. 9.

In another example, the UE may receive, from the network entity, a plurality of acceptance messages from a subset of the set of multiple P-CSCF addresses based on the registering message. Then, the UE may transmit, to the network entity, an invitation message to one of the subset of the set of multiple P-CSCF addresses to establish an emergency call connection. In such an example, the invitation message may be transmitted to a P-CSCF address for which an acceptance message is first received.

In another example, the UE may transmit, to the network entity, an invitation message to a P-CSCF address from which an acceptance message is received to establish an emergency call connection, such as described in connection with FIG. 6. The transmission of the invitation message may be performed by, e.g., the invitation message component 948 and/or the transmission component 934 of the apparatus 902 in FIG. 9.

In another example, if no response is received from any of the set of multiple P-CSCF addresses within a threshold period, or if a rejection is received from one or more of the set of multiple P-CSCF addresses within a threshold period, the UE may initiate an CSFB procedure, transmit an invitation message to at least one of the set of multiple P-CSCF addresses anonymously, or retry the request to set up the ePDN at another IP RAT, such as described in connection with FIG. 6. For example, at 622, the UE 602 may transmit an invitation message to at least one of the set of multiple P-CSCF addresses anonymously, or retry the request to set up the ePDN at another IP RAT if the eREGISTER response wait timer or the emergency call set up timer expires. The initiation of the CSFB procedure, transmission of the invitation message anonymously, or retrying the request to set up the ePDN at another IP RAT may be performed by, e.g., the alternative procedure initiation component 950 of the apparatus 902 in FIG. 9.

In another example, the IP RAT may include 5G NR, 4G LTE, or Wi-Fi.

Figure 9:
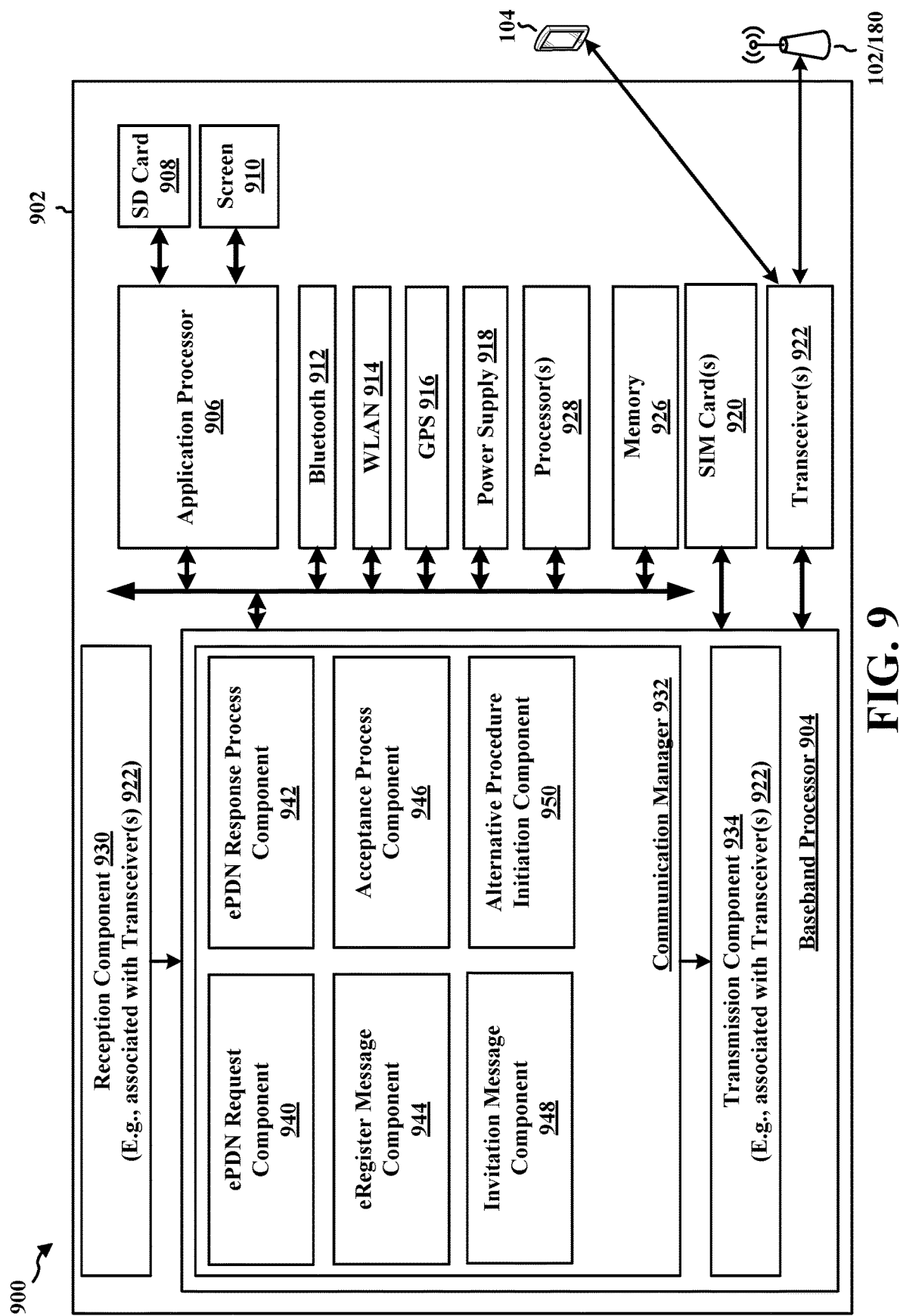
FIG. 9 is a diagram illustrating an example of a hardware implementation for an example apparatus in accordance with various aspects of the present disclosure.

FIG. 9 is a diagram 900 illustrating an example of a hardware implementation for an apparatus 902. The apparatus 902 may be a UE, a component of a UE, or may implement UE functionality. In some aspects, the apparatus 902 may include a baseband processor 904 (also referred to as a modem) coupled to at least one transceiver 922 (e.g., one or more RF transceivers and/or antennas). The at least one transceiver 922 may be associated with or include a reception component 930 and/or a transmission component 934. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The baseband processor 904 communicates through the at least one transceiver 922 with the BS 102/180 or another UE. The baseband processor 904 may include a computer-readable medium/memory (e.g., a memory 926). The computer-readable medium/memory may be non-transitory. The baseband processor 904 and/or at least one processor 928 is responsible for general processing, including the execution of software stored on the computer-readable medium/memory. The software, when executed by the baseband processor 904 and/or the at least one processor 928, causes the baseband processor 904 and/or the at least one processor 928 to perform the various functions described supra. The computer-readable medium/memory may also be used for storing data that is manipulated by the baseband processor 904 when executing software. The baseband processor 904 further includes the reception component 930, a communication manager 932, and the transmission component 934. The reception component 930 and the transmission component 934 may, in a non-limiting example, include at least one transceiver and/or at least one antenna subsystem. The communication manager 932 includes the one or more illustrated components. The components within the communication manager 932 may be stored in the computer-readable medium/memory and/or configured as hardware within the baseband processor 904. The baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes an ePDN request component 940 that is configured to transmit, to a network entity, a request to set up an ePDN, e.g., as described in connection with 702 of FIG. 7 and/or 802 of FIG. 8. The communication manager 932 further includes an ePDN response process component 942 that is configured to receive, from the network entity, a response to the request comprising a set of multiple P-CSCF addresses, e.g., as described in connection with 704 of FIG. 7 and/or 804 of FIG. 8. The communication manager 932 further includes an eREGISTER message component 944 that is configured to transmit, to the network entity, a registering message to each of the multiple P-CSCF addresses simultaneously, e.g., as described in connection with 706 of FIG. 7 and/or 806 of FIG. 8. The communication manager 932 further includes an acceptance process component 946 that is configured to receive, from the network entity, at least one acceptance message from at least one of the set of multiple P-CSCF addresses in response to the registering message, e.g., as described in connection with 708 of FIG. 7. The communication manager 932 further includes an invitation message component 948 that is configured to transmit, to the network entity, an invitation message to a P-CSCF address from which an acceptance message is received to establish an emergency call connection, e.g., as described in connection with 710 of FIG. 7. The communication manager 932 further includes an alternative procedure initiation component 950 that is configured to initiate an CSFB procedure, transmit an invitation message to at least one of the set of multiple P-CSCF addresses anonymously, or retry the request to set up the ePDN at another IP RAT, e.g., as described in connection with 712 of FIG. 7.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the baseband processor 904, includes means for transmitting, to a network entity, a request to set up an ePDN (e.g., the ePDN request component 940 and/or the transmission component 934). The apparatus 902 includes means for receiving, from the network entity, a response to the request comprising a set of multiple P-CSCF addresses (e.g., the ePDN response process component 942 and/or the reception component 930). The apparatus 902 includes means for transmitting, to the network entity, a registering message to each of the multiple P-CSCF addresses simultaneously (e.g., the eREGISTER message component 944 and/or the transmission component 934). The apparatus 902 includes means for receiving, from the network entity, at least one acceptance message from at least one of the set of multiple P-CSCF addresses in response to the registering message (e.g., the acceptance process component 946 and/or the reception component 930). The apparatus 902 includes means for transmitting, to the network entity, an invitation message to a P-CSCF address from which an acceptance message is received to establish an emergency call connection (e.g., the invitation message component 948 and/or the transmission component 934). The apparatus 902 includes means for initiating an CSFB procedure, means for transmitting an invitation message to at least one of the set of multiple P-CSCF addresses anonymously, or means for retrying the request to set up the ePDN at another IP RAT (e.g., the alternative procedure initiation component 950).

The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 10:
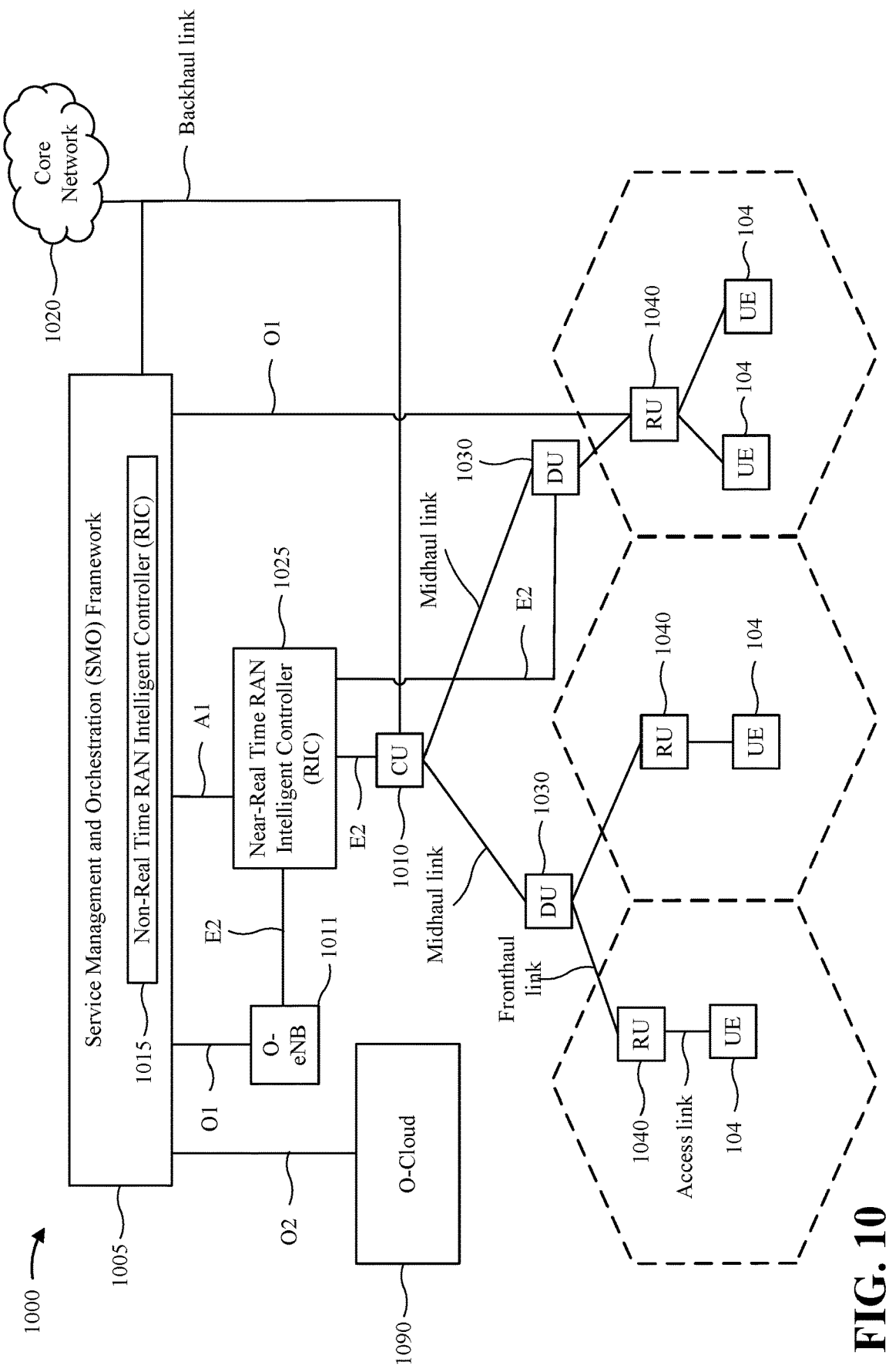
FIG. 10 is a diagram illustrating an example disaggregated base station architecture.

FIG. 10 shows a diagram illustrating an example disaggregated base station 1000 architecture. The disaggregated base station 1000 architecture may include one or more central units (CUs) 1010 that can communicate directly with a core network 1020 via a backhaul link, or indirectly with the core network 1020 through one or more disaggregated base station units (such as a Near-Real Time (Near-RT) RAN Intelligent Controller (RIC) 1025 via an E2 link, or a Non-Real Time (Non-RT) RIC 1015 associated with a Service Management and Orchestration (SMO) Framework 1005, or both). A CU 1010 may communicate with one or more distributed units (DUs) 1030 via respective midhaul links, such as an F1 interface. The DUs 1030 may communicate with one or more radio units (RUs) 1040 via respective fronthaul links. The RUs 1040 may communicate with respective UEs 104 via one or more radio frequency (RF) access links. In some implementations, the UE 104 may be simultaneously served by multiple RUs 1040.

Each of the units, i.e., the CUs 1010, the DUs 1030, the RUs 1040, as well as the Near-RT RICs 1025, the Non-RT RICs 1015 and the SMO Framework 1005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1010. The CU 1010 may be configured to handle user plane functionality (i.e., Central Unit—User Plane (CU-UP)), control plane functionality (i.e., Central Unit—Control Plane (CU-CP)), or a combination thereof. In some implementations, the CU 1010 can be logically split into one or more CU-UP units and one or more CU-CP units. The CU-UP unit can communicate bidirectionally with the CU-CP unit via an interface, such as the E1 interface when implemented in an O-RAN configuration. The CU 1010 can be implemented to communicate with the DU 1030, as necessary, for network control and signaling.

The DU 1030 may correspond to a logical unit that includes one or more base station functions to control the operation of one or more RUs 1040. In some aspects, the DU 1030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 1030 may further host one or more low PHY layers. Each layer (or module) can be implemented with an interface configured to communicate signals with other layers (and modules) hosted by the DU 1030, or with the control functions hosted by the CU 1010.

Lower-layer functionality can be implemented by one or more RUs 1040. In some deployments, an RU 1040, controlled by a DU 1030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1040 can be implemented to handle over the air (OTA) communication with one or more UEs 104. In some implementations, real-time and non-real-time aspects of control and user plane communication with the RU(s) 1040 can be controlled by the corresponding DU 1030. In some scenarios, this configuration can enable the DU(s) 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements which may be managed via an operations and maintenance interface (such as an O1 interface). For virtualized network elements, the SMO Framework 1005 may be configured to interact with a cloud computing platform (such as an open cloud (O-Cloud) 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040 and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with one or more RUs 1040 via an O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via O1) or via creation of RAN management policies (such as A1 policies).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one sensor, and at least one processor coupled to a memory and configured to: transmit, to a network entity, a request to set up an ePDN; receive, from the network entity, a response to the request comprising a set of multiple P-CSCF addresses; and transmit, to the network entity, a registering message to each of the multiple P-CSCF addresses simultaneously.

Aspect 2 is the apparatus of aspect 1, where the network entity includes a base station or one or more components of the base station.

Aspect 3 is the apparatus of any of aspects 1 and 2, where the at least one processor and the memory are further configured to: receive, from the network entity, at least one acceptance message from at least one of the set of multiple P-CSCF addresses in response to the registering message; and transmit, to the network entity, an invitation message to a P-CSCF address from which an acceptance message is received to establish an emergency call connection.

Aspect 4 is the apparatus of any of aspects 1 to 3, where the at least one processor and the memory are further configured to: receive, from the network entity, a plurality of acceptance messages from a subset of the set of multiple P-CSCF addresses based on the registering message; and transmit, to the network entity, an invitation message to one of the subset of the set of multiple P-CSCF addresses to establish an emergency call connection.

Aspect 5 is the apparatus of any of aspects 1 to 4, where the invitation message is transmitted to a P-CSCF address for which an acceptance message is first received.

Aspect 6 is the apparatus of any of aspects 1 to 5, where if no response is received from any of the set of multiple P-CSCF addresses within a threshold period, the at least one processor and the memory are further configured to: initiate an CSFB procedure, transmit an invitation message to at least one of the set of multiple P-CSCF addresses anonymously, or retry the request to set up the ePDN at another IP RAT.

Aspect 7 is the apparatus of any of aspects 1 to 6, where if a rejection is received from one or more of the set of multiple P-CSCF addresses within a threshold period, the at least one processor and the memory are further configured to: initiate an CSFB procedure, transmit an invitation message to at least one of the set of multiple P-CSCF addresses anonymously, or retry the request to set up the ePDN at another IP RAT.

Aspect 8 is the apparatus of any of aspects 1 to 7, where the IP RAT includes 5G NR, 4G LTE, or Wi-Fi.

Aspect 9 is the apparatus of any of aspects 1 to 8 further comprises a transceiver coupled to the at least one processor.

Aspect 10 is a method of wireless communication for implementing any of aspects 1 to 9.

Aspect 11 is an apparatus for wireless communication including means for implementing any of aspects 1 to 9.

Aspect 12 is a computer-readable medium storing computer executable code, where the code when executed by a processor causes the processor to implement any of aspects 1 to 9.

What is claimed is:

1. An apparatus for wireless communication at a user equipment (UE), comprising:
   memory; and
   at least one processor coupled to the memory and configured to:
   transmit, to a network entity, a request to set up an emergency packet data network (ePDN);
   receive, from the network entity, a response to the request comprising a set of multiple proxy-call session control function (P-CSCF) addresses;
   transmit, from the UE to the network entity, a registering message to each of the multiple P-CSCF addresses simultaneously to attempt to establish an emergency call connection via each of the multiple P-CSCF addresses simultaneously;
   receive, from the network entity, a plurality of acceptance messages from a subset of the set of multiple P-CSCF addresses based on the registering message; and
   transmit, to the network entity, an invitation message to one of the subset of the set of multiple P-CSCF addresses to establish the emergency call connection.

2. The apparatus of claim 1, wherein the network entity includes a base station or one or more components of the base station.

3. The apparatus of claim 1, wherein the invitation message is transmitted to a P-CSCF address for which an acceptance message is first received.

4. The apparatus of claim 1, wherein if no response is received from any of the set of multiple P-CSCF addresses within a threshold period, the at least one processor and the memory are further configured to:
   initiate a circuit switch fall back (CSFB) procedure,
   transmit the invitation message to at least one of the set of multiple P-CSCF addresses anonymously, or
   retry the request to set up the ePDN at another internet protocol (IP) radio access technology (RAT).

5. The apparatus of claim 4, wherein the IP RAT includes 5G New Radio (NR), 4G Long Term Evolution (LTE), or Wi-Fi.

6. The apparatus of claim 1, wherein if a rejection is received from one or more of the set of multiple P-CSCF addresses within a threshold period, the at least one processor and the memory are further configured to:
   initiate a circuit switch fall back (CSFB) procedure,
   transmit the invitation message to at least one of the set of multiple P-CSCF addresses anonymously, or
   retry the request to set up the ePDN at a different internet protocol (IP) radio access technology (RAT).

7. The apparatus of claim 6, wherein the IP RAT includes 5G New Radio (NR), 4G Long Term Evolution (LTE), or Wi-Fi.

8. The apparatus of claim 1, further comprising a transceiver coupled to the at least one processor.

9. A method of wireless communication at a user equipment (UE), comprising:
   transmitting, to a network entity, a request to set up an emergency packet data network (ePDN);
   receiving, from the network entity, a response to the request comprising a set of multiple proxy-call session control function (P-CSCF) addresses;
   transmitting, from the UE to the network entity, a registering message to each of the multiple P-CSCF addresses simultaneously to attempt to establish an emergency call connection via each of the multiple P-CSCF addresses simultaneously;
   receiving, from the network entity, a plurality of acceptance messages from a subset of the set of multiple P-CSCF addresses based on the registering message; and
   transmitting, to the network entity, an invitation message to one of the subset of the set of multiple P-CSCF addresses to establish the emergency call connection.

10. The method of claim 9, wherein the network entity includes a base station or one or more components of the base station.

11. The method of claim 9, wherein the invitation message is transmitted to a P-CSCF address for which an acceptance message is first received.

12. The method of claim 9, wherein if no response is received from any of the set of multiple P-CSCF addresses within a threshold period, the method further comprises:
   initiating a circuit switch fall back (CSFB) procedure,
   transmitting the invitation message to at least one of the set of multiple P-CSCF addresses anonymously, or
   retrying the request to set up the ePDN at another internet protocol (IP) radio access technology (RAT).

13. The method of claim 12, wherein the IP RAT includes 5G New Radio (NR), 4G Long Term Evolution (LTE), or Wi-Fi.

14. The method of claim 9, wherein if a rejection is received from one or more of the set of multiple P-CSCF addresses within a threshold period, the method further comprises:
   initiating a circuit switch fall back (CSFB) procedure,
   transmitting the invitation message to at least one of the set of multiple P-CSCF addresses anonymously, or
   retrying the request to set up the ePDN at a different internet protocol (IP) radio access technology (RAT).

15. The method of claim 14, wherein the IP RAT includes 5G New Radio (NR), 4G Long Term Evolution (LTE), or Wi-Fi.

16. An apparatus for wireless communication at a user equipment (UE), comprising:
   means for transmitting, to a network entity, a request to set up an emergency packet data network (ePDN);
   means for receiving, from the network entity, a response to the request comprising a set of multiple proxy-call session control function (P-CSCF) addresses;
   means for transmitting, from the UE to the network entity, a registering message to each of the multiple P-CSCF addresses simultaneously to attempt to establish an emergency call connection via each of the multiple P-CSCF addresses simultaneously;
   means for receiving, from the network entity, a plurality of acceptance messages from a subset of the set of multiple P-CSCF addresses based on the registering message; and
   means for transmitting, to the network entity, an invitation message to one of the subset of the set of multiple P-CSCF addresses to establish the emergency call connection.

17. The apparatus of claim 16, wherein the network entity includes a base station or one or more components of the base station.

18. The apparatus of claim 16, wherein the invitation message is transmitted to a P-CSCF address for which an acceptance message is first received.

19. The apparatus of claim 16, wherein if no response is received from any of the set of multiple P-CSCF addresses within a threshold period, the apparatus further comprises:
   means for initiating a circuit switch fall back (CSFB) procedure,
   means for transmitting the invitation message to at least one of the set of multiple P-CSCF addresses anonymously, or
   means for retrying the request to set up the ePDN at another internet protocol (IP) radio access technology (RAT).

20. The apparatus of claim 19, wherein the IP RAT includes 5G New Radio (NR), 4G Long Term Evolution (LTE), or Wi-Fi.

21. The apparatus of claim 16, wherein if a rejection is received from one or more of the set of multiple P-CSCF addresses within a threshold period, the apparatus further comprises:
   means for initiating a circuit switch fall back (CSFB) procedure,
   means for transmitting the invitation message to at least one of the set of multiple P-CSCF addresses anonymously, or
   means for retrying the request to set up the ePDN at a different internet protocol (IP) radio access technology (RAT).

22. The apparatus of claim 21, wherein the IP RAT includes 5G New Radio (NR), 4G Long Term Evolution (LTE), or Wi-Fi.

23. The apparatus of claim 16, further comprising a transceiver.

24. A non-transitory computer-readable medium storing computer executable code at a user equipment (UE), the code when executed by at least one processor causes the at least one processor to:
   transmit, to a network entity, a request to set up an emergency packet data network (ePDN);
   receive, from the network entity, a response to the request comprising a set of multiple proxy-call session control function (P-CSCF) addresses;
   transmit, from the UE to the network entity, a registering message to each of the multiple P-CSCF addresses simultaneously to attempt to establish an emergency call connection via each of the multiple P-CSCF addresses simultaneously;
receive, from the network entity, a plurality of acceptance messages from a subset of the set of multiple P-CSCF addresses based on the registering message; and
transmit, to the network entity, an invitation message to one of the subset of the set of multiple P-CSCF addresses to establish the emergency call connection.

* * * * *